US008759451B2

(12) United States Patent
Mruk et al.

(10) Patent No.: US 8,759,451 B2
(45) Date of Patent: Jun. 24, 2014

(54) METHOD OF MAKING A GRAFT COPOLYMER

(75) Inventors: Ralf Mruk, Lipperscheid (LU); Frank Schmitz, Bissen (LU); Robert Fokko Roskamp, Triet (DE); Alexandra Hermann, Mainz (DE); Rudolf Wilhelm Zentel, Nierstein (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 87 days.

(21) Appl. No.: 13/333,083

(22) Filed: Dec. 21, 2011

(65) Prior Publication Data

US 2013/0165589 A1 Jun. 27, 2013

(51) Int. Cl.
*C08L 51/04* (2006.01)

(52) U.S. Cl.
USPC ........... 525/222; 525/232; 525/233; 525/242; 525/326.1; 525/328.2; 525/330.3; 525/374; 525/378

(58) Field of Classification Search
USPC ........... 525/222, 232, 233, 242, 326.1, 328.2, 525/330.3, 374, 378
See application file for complete search history.

(56) References Cited

U.S. PATENT DOCUMENTS

| 4,755,564 | A  | 7/1988  | Lindner et al. ................. 525/293 |
| 4,937,290 | A  | 6/1990  | Bauer et al. .................... 525/184 |
| 6,486,213 | B1 | 11/2002 | Chen et al. .................... 514/772.1 |
| 7,166,665 | B2 | 1/2007  | Galimberti et al. ........... 524/492 |
| 7,671,152 | B2 | 3/2010  | Parker et al. .................. 525/204 |
| 7,847,019 | B2 | 12/2010 | David et al. ................... 525/54.1 |
| 7,883,692 | B2 | 2/2011  | L'Alloret .................... 424/78.02 |
| 7,943,680 | B2 | 5/2011  | Bowman et al. ................. 522/6 |

FOREIGN PATENT DOCUMENTS

| EP | 0583814      |    | 2/1994  |
| EP | 0629649      | A1 | 12/1994 |
| GB | 785631       |    | 10/1957 |
| JP | 60188411     |    | 9/1985  |
| JP | S60188411    |    | 9/1985  |
| JP | 2001123018   | A  | 5/2001  |
| JP | 2011184511   | A  | 9/2011  |

OTHER PUBLICATIONS

Kryger, Matt, "Applications of Thiol-ENE Coupling", *Abstract*, Dec. 11, 2008, pp. 1-8, Retrieved from the Internet, http://www.chemistry.illinois.edu/research/organic/seminar_extracts/2008_2009/Matt_Kryger_Chem535_FA08_Abstract.pdf.
Moad, Graeme et al., "Living Radical Polymerization by the RAFT Process", *Australian J. Chemistry* 2005, vol. 58, pp. 379-410, Retrieved from the Internet: URL: http://ww.publish.csiro.au/journals/ajc.
Lutz, Jean-Francois, "Modular Chemical Tools for Advanced Maromolecular Engineering", *Polymer*, vol. 49, Issue 4, Feb. 18, 2008, pp. 817-824.
Goldmann, Anja S., et al. "Surface Modification of Poly(divinyldenzene) Microspheres via Thiol™Ene Chemistry and Alkyne™Azide Click Reactions", *Macromolecules*, Apr. 27, 2009, Retrieved from the Internet: URL:http://pubs.acs.org.
Mori, Noriko, et al., "Temperature-Induced Changes in the Surface Wettability of SBR + PNIPA Films", *Macromolecular Materials and Engineering*, 2007, vol. 292, pp. 917-922, Retrieved from the Internet: URL: http://www.mme-journal.de.
Brummelhuis, Niels ten et al., "Thiol#Ene Modification of 1,2-Polybutadiene Using UV Light or Sunlight", *Macromolecules*, 2008, 41, pp. 9946-9947, Retrieved from the Internet: URL: http://www.pubs.acs.org.
Gerber, R. Eric et al., -Mercaptopropionitrile (2-Cyanoethanethiol), Organic Synthesis, Coll. vol. 10, p. 234 (2004); vol. 77, p. 186 (2000).
Harrisson, Simon, "Radical-Catalyzed Oxidation of Thiols by Trithiocarbonate and Dithioester Raft Agents: Implications for the Preparation of Polymers with Terminal Thiol Functionality", Macromolecules, vol. 42, p. 897-898 (2009).
Brummelhuis, Niels ten et al., "Supporting Information to Thiol#Ene Modification of 1,2-Polybutadiene Using UV Light or Sunlight", Macromolecules vol. 41, p. S1-S85 (2008).
English Translation of JP2001123018 (2001).
English Translation of JP2011184511 (2011).

*Primary Examiner* — Jeffrey Mullis
(74) *Attorney, Agent, or Firm* — John D. DeLong

(57) ABSTRACT

The present invention is directed to a method of making a graft copolymer, comprising the steps of:
  obtaining a first polymer comprising at least one carbon-carbon double bond, the first polymer derived from at least one monomer, the at least one monomer comprising a conjugated diene monomer;
  polymerizing a second monomer in the presence of a thiocarbonylthio RAFT chain transfer agent to form a polymer comprising a terminal thiocarbonylthio group;
  cleaving the terminal thiocarbonylthio group to a thiol group to form the second polymer comprising a terminal thiol group;
  reacting the second polymer with the first polymer to form a graft copolymer, the graft copolymer comprising a backbone derived from the first polymer and sidechains derived from the second polymer.

8 Claims, 3 Drawing Sheets

METHOD OF MAKING A GRAFT COPOLYMER

BACKGROUND OF THE INVENTION

In the ongoing effort to improve tire design, there is a recognized tension among tire performance, rolling resistance (or fuel economy), and treadwear. Typically, for use in a consumer tire, a tread compound is designed to optimized between these three considerations. However, efforts to improve for example fuel economy often lead to compromises in performance and/or treadwear. For higher performance tires desired by driving enthusiasts, the achievement better performance often comes with a compromise in treadwear or fuel economy. There is a desire therefore to develop tread compounds that can achieve improvement in any of performance, fuel economy, and treadwear with little or no compromise in the other two. One approach is in the elastomeric polymers used in the tread compound.

The reversible addition-fragmentation chain transfer (RAFT) polymerization is a versatile controlled radical polymerization method which can be used for the polymerization of a variety of monomers. Due to the controlled characteristics of the RAFT-polymerization, the polydispersities of the resulting polymers are relatively low and their molecular weights can be modified within a wide range by changing the initiator and CTA concentration. The RAFT-polymerization is initiated by a radical starter (for example AIBN) and a chain transfer agent (CTA). Suitable CTAs contain thiocarbonylthio-moieties such as dithioesters, trithiocarbonates, dithiocarbamates and xanthates. After the RAFT-polymerization, the respective thiocarbonylthio-moieties remain attached to the polymer chains as functional endgroups.

SUMMARY OF THE INVENTION

The present invention is directed to a method of making a graft copolymer, comprising the steps of:

obtaining a first polymer comprising at least one carbon-carbon double bond, the first polymer derived from at least one monomer, the at least one monomer comprising a conjugated diene monomer;

polymerizing a second monomer in the presence of a thiocarbonylthio RAFT chain transfer agent to form a polymer comprising a terminal thiocarbonylthio group;

cleaving the terminal thiocarbonylthio group to a thiol group to form the second polymer comprising a terminal thiol group;

reacting the second polymer with the first polymer to form a graft copolymer, the graft copolymer comprising a backbone derived from the first polymer and sidechains derived from the second polymer.

DETAILED DESCRIPTION

Figure 1:
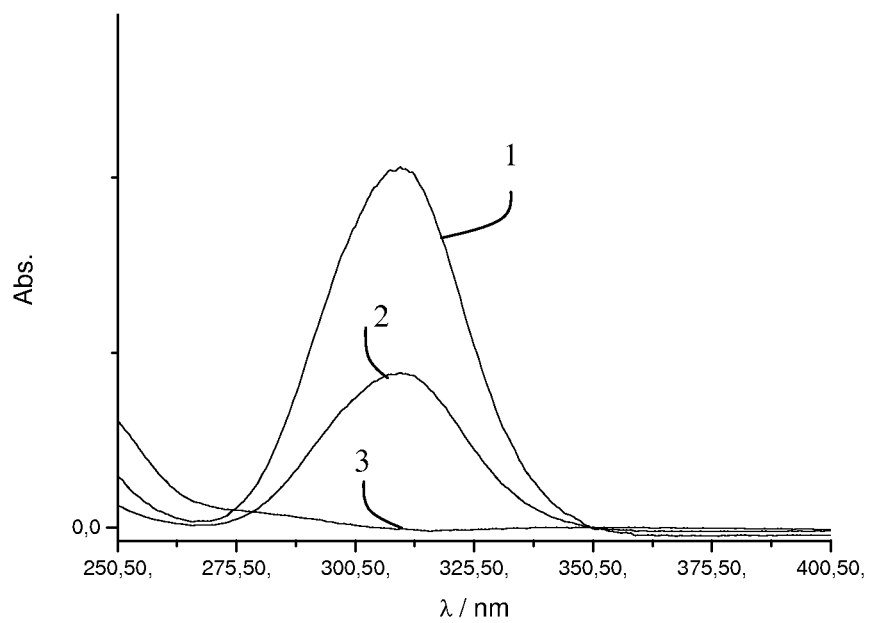
FIG. 1 shows UV-VIS spectra of a trithiocarbonate RAFT chain transfer agent, PNIPAM with a trithiocarbonate-end group and PNIPAM with a thiol group.

The present invention is directed to use of endfunctionalized polymers produced by RAFT-polymerization in rubber compounds. Thiocarbonylthio-moieties representing the endgroups of the RAFT-polymers can be considered as protected mercapto-groups. During mixing or vulcanization the endgroups can be cleaved by nucleophiles present in the compounds. Non-limiting examples for nucleophiles that could induce the cleavage are accelerators (such as diphenyl guanidine or cyclohexylamine derived from CBS) or antioxidants such as 6-PPD. An example of the cleavage of thiocarbonylthio moieties is the cleavage of thioesters in rubber compounds which can be transformed to the respective thiol by reaction with diphenylguanidine. The thiol-endfunctionalized RAFT-polymers obtained by the cleavage of the respective thiocarbonylthio-moieties can couple with rubber elastomers during the vulcanization reaction.

The functionalization of rubber elastomers with side chains derived from RAFT-polymers can lead to compounds with unique properties. In case of side chains exhibiting a lower critical solution temperature (LCST), a thermo-responsive compound behavior in contact with water (for example a wet road surface) could be induced. In general, hydrophilic side chains could lead to an improvement of polymer-filler interactions which could lead to an improvement of triangle properties. In the case of thermoplastic side chains (for example styrene derivatives, N-monosubstituted or N,N-disubstituted polyacrylamides; polyacrylates or polymethacrylates might also be considered but interference with the cleavage reaction would have to be checked), the side chains could act as thermoplastic phase in the final compound leading to additional reinforcement. In addition to homopolymers, statistic copolymers or block-copolymers obtained by RAFT-polymerization could also be used in compounds. In contrast to a simple addition of non-functionalized polymers to the compound formulation, the covalent coupling of the thiol endfunctionalized RAFT-polymers to the elastomers will prevent macro-phase separation which would prevent the improvement of compound properties. In order to ensure a reasonable diffusion rate of the RAFT-polymers within the compound prior to coupling and a sufficient concentration of thiol-endgroups with respect to the overall RAFT-polymer molecular weight, it is likely that RAFT-polymers with a relatively low molecular weight (for example in the range of several 1,000 g/mol or even lower molecular weight species) are preferable.

There is now disclosed a method of making a graft copolymer, comprising the steps of:

obtaining a first polymer comprising at least one carbon-carbon double bond, the first polymer derived from at least one monomer, the at least one monomer comprising a conjugated diene monomer;

polymerizing a second monomer in the presence of a thiocarbonylthio RAFT chain transfer agent to form a polymer comprising a terminal thiocarbonylthio group;

cleaving the terminal thiocarbonylthio group to a thiol group to form a second polymer comprising a terminal thiol group;

reacting the second polymer with the first polymer to form a graft copolymer, the graft copolymer comprising a backbone derived from the first polymer and sidechains derived from the second polymer.

There is further disclosed a rubber composition comprising the graft copolymer, and a pneumatic tire with a tread comprising the rubber composition.

One step of the method to produce the graft copolymer is to obtain, a first polymer comprising at least one carbon-carbon double bond. In one embodiment, the first polymer comprising at least one carbon-carbon double bond is a diene based elastomer. The phrases "rubber or elastomer containing olefinic unsaturation" or "diene based elastomer" as used herein are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic rubbers are the homopolymerization products of butadiene and its homologues and derivatives, for example, methylbutadiene (i.e., isoprene), dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

The second polymer is obtained by polymerizing a second monomer in the presence of a thiocarbonylthio RAFT chain transfer agent to form a polymer comprising a terminal thiocarbonylthio group; and cleaving the terminal thiocarbonylthio group to a thiol group to form the second polymer comprising a terminal thiol group.

The terminal functional group of the second polymer is incorporated in the second polymer during polymerization through the mechanism of reversible addition-fragmentation chain transfer (RAFT). More details of the RAFT polymerization mechanism may be found by reference to Moad et al., *Aust. J. Chem.* 2005, 58, 379-410. As is known in the art, RAFT polymerization of free-radical polymerizable monomers is accomplished in the presence of a thiocarbonylthio RAFT chain transfer agent of general formula (I)

where $R^1$ is a free radical leaving group able to reinitiate polymerization, and Z is a functional group that influences the rate of radical addition and fragmentation. Suitable thiocarbonylthio RAFT chain transfer agents include dithioesters, trithiocarbonates, dithiocarbamates, and xanthates. Suitable RAFT chain transfer agents are known in the art, for example as disclosed in Moad et al., *Aust. J. Chem.* 2005, 58, 379-410; U.S. Pat. Nos. 7,399,801; 7,666,962; U.S. Publications 2007/0225447; 2007/0232783. Multifunctional RAFT agents are known, as disclosed for example in Bivigou-Koumba et al., *Macromolecular Chemistry and Physics* 2009, 210, 565-578.

In one embodiment, the thiocarbonylthio chain transfer agent is a trithiocarbonate. In one embodiment, the thiocarbonylthio chain transfer agent is selected from the group consisting of S-1-dodecyl-S-(αα'-dimethyl-α"-acetic acid) trithiocarbonate and 4-cyano-4-dodecylsulfanylthiocarbonylsulfanyl-4-methyl butyric acid.

Upon RAFT polymerization in the presence of a suitable thiocarbonylthio chain transfer agent, the chain-terminated polymer has the general formula (II)

where $P_n$ represents the polymer formed by RAFT polymerization.

Second monomers suitable for use in the RAFT polymerizatoni include styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, isoprene, 1,3-butadiene, ethylene, vinyl acetate, vinyl chloride, vinylidene chloride, oxidants, lactones, lactams, cyclic anhydrides, cyclic siloxanes and combinations thereof. Functionalized versions of these monomers may also be used. Specific monomers or comonomers that may be used include methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, .alpha.-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), α-methylvinyl benzoic acid (all isomers), diethylamino α-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, chloroprene, ethylene, vinyl acetate, vinyl chloride, vinylidene chloride, 2-(2-oxo-1-imidazolidinyl)ethyl 2-methyl-2-propenoate, 1-[2-[2-hydroxy-3-(2-propyl)propyl]amino]ethyl]-2-imidazolidinone, N-vinyl pyrrolidone, N-vinyl imidazole, crotonic acid, vinyl sulfonic acid, and combinations thereof.

In one embodiment, the second monomer to be used in the RAFT polymerization includes acrylamides and substituted acrylamides, methacrylamides and substituted methacrylamides, acrylic acids and substituted acrylic acids, methacrylic acids and substituted methacrylic acids, vinyl alkyl ethers and substituted vinyl alkyl ethers, vinyl caprolactams and substituted vinyl caprolactams, oligo(ethylene glycol) methacrylate and 2-(2-methoxyethoxy) ethyl methacrylate, and the like.

In one embodiment, the second monomer is of formula III

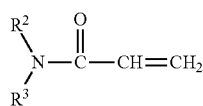

(III)

where $R^2$ and $R^3$ are independently selected from the group consisting of hydrogen, C2 to C6 linear alkyl, C2 to C6 branched alkyl, and C3 to C6 cycloalkyl, with the proviso that at least one of $R^2$ and $R^3$ is not hydrogen.

The chain terminated polymer of formula II is then reacted with a suitable nucleophile to cleave the C—S linkage to obtain a second polymer of formula (IV) having a terminal thiol group

(IV)

In one embodiment, the chain terminated polymer of formula II is treated by aminolysis to obtain the thiol-terminated polymer of formula IV.

In its thiol form shown in formula IV, the second polymer may be combined in a rubber composition with the diene based first polymer during rubber mixing as for example in a Banbury mixer, rubber mill or the like. No solvent is required and is generally excluded. During reacting of the thiol terminated second polymer of compound IV with the diene based elastomer, the compound of formula IV reacts with the diene based elastomer through reaction of a terminal thiol groups of the compound of formula IV with the unsaturated carbon-carbon bond of the diene based elastomer.

In one embodiment, the thiol-terminated compound IV is reacted with the diene based elastomer in the presence of a free-radical initiator via a thiol-ene reaction as is known in the art, see for example *Macromolecules* 2008, 41, 9946-9947. In one embodiment, the free-radical initiator is selected from the group consisitng of 2,4,6-Trimethylbenzoyldiphenylphosphine oxide and azobisisobutyonitrile (AIBN).

Alternatively, the reaction between the first and second polymers may occur by adding the chain terminated polymer of formula II to the rubber composition in its uncleaved form. In the presence of suitable nucleophile such as diphenylguanidine or a phenylene diamine compound, the polymer of formula II may be cleaved in situ during the rubber mixing and curing process, thereby exposing the thiol radical to react with the diene based elastomer to form the graft copolymer. Other potentially suitable nucleophiles might include amines generated by curatives, for example cyclohexylamine generated by decomposition of CBS or ammonia derived from hexamethylene tetramine used as secondary accelerator.

Alternatively to the described direct thiol-ene reaction between thiol and elastomer, other reaction mechanisms involving other components of the cure system are possible. For example and without wishing to be bound by any theory, the thiol might react with sulfur and a mercaptobenzothiazole type accelerator to a polysulfide-containing compound which might be integrated into the elastomer network via a standard cure reaction. In this case, the presence of a radical starter would not be required.

In order to efficiently obtain cleavage of the thiocarbonylthio functional group to the thiol during rubber mixing, the molecular weight of the chain terminated polymer of formula II should be low enough to facilitate mixing of the rubber composition such that the thiocarbonylthio groups obtain good contact with the nucleophile and consequently cleave to the thiol form. In one embodiment, the molecular weight of the second polymer may be in a range of from 500 to 1000.

Whether the thiocarbonylthio group is cleaved prior to or after the chain terminated polymer is added to the first polymer, the number n of [S—$P_n$]groups bonded to the first polymer ranges from about 2 to about 30 in a given copolymer molecule.

The graft copolymer may be included in a rubber composition.

The rubber composition may include, in addition to the graft copolymer, one or more diene based elastomers. The phrases "rubber or elastomer containing olefinic unsaturation" or "diene based elastomer" are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

$$Z\text{-Alk-}S_n\text{-Alk-}Z \qquad V$$

in which Z is selected from the group consisting of

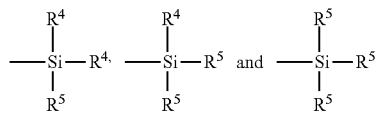

where $R^4$ is an alkyl group of 1 to 4 carbon atoms, cyclohexyl or phenyl; $R^5$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula V, Z may be

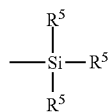

where $R^5$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

Example 1

In this example, preparation of poly-(N-isopropylacrylamide), or PNIPAM, is illustrated.

RAFT-polymerization was used for the preparation of PNIPAM. For this purpose two alternative chain transfer agents (CTA) were prepared: S-1-Dodecyl-S-(αα'-dimethyl-α"-aceticacid)trithiocarbonate (DMP) and 4-Cyano-4-dodecylsulfanylthiocarbonylsulfanyl-4-methyl butyric acid (CDSMB).

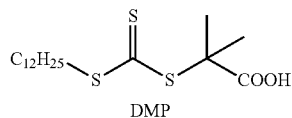

DMP

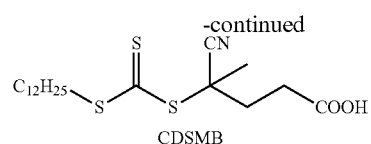

CDSMB

The RAFT reaction scheme is as follows:

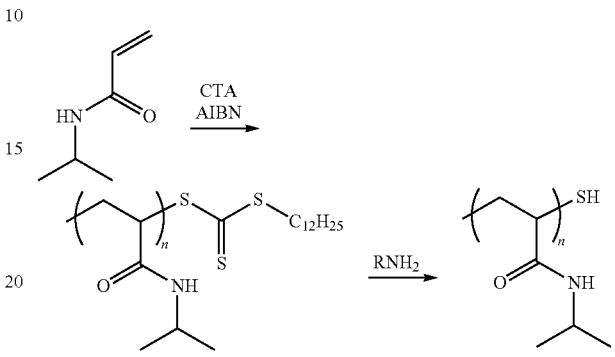

Synthesis of Chain Transfer Agents
S-1-Dodecyl-S-(αα'-dimethyl-α"-acetic acid)trithiocarbonate (DMP)

S-1-Dodecyl-S-(αα'-dimethyl-α"-acetic acid)trithiocarbonate was synthesized using literature procedure. [J. T. Lai, D. Filla, R. Shea, *Macromolecules* 2002, 35, 6754.]
Yield: 41%
$^1$H-NMR (CDCl$_3$/300 MHz): δ[ppm]: 0.85; (t, 3H), 1.16-1.47; (m, 20H), 1.71; (s, 6H), 3.26; (t, 2H), 13.05; (s, 1H)
4-Cyano-4-dodecylsulfanylthiocarbonylsulfanyl-4-methyl butyric acid (CDSMB)

4-Cyano-4-dodecylsulfanylthiocarbonylsulfanyl-4-methyl butyric acid was synthesized in two steps. The first step was prepared using literature procedure [W. G. Weber, J. B. McLeary, R. D. Sanderson, *Tetrahedron Lett.* 2006, 47, 4771.].
Step 1: Bis-(dodecylsulfanylthiocarbonyl)disulfide
Yield: 72%
$^1$H-NMR (CDCl$_3$/300 MHz): δ[ppm]: 0.86; (t, 6H); 1.11-1.43; (m, 36H); 1.65; (q, 4H); 2.66; (t, 4H)
Step 2: 4-Cyano-4-dodecylsulfanylthiocarbonylsulfanyl-4-methyl butyric acid 10 g of Bis-(dodecylsulfanylthiocarbonyl)disulfide and 7.7 g of 4.4'-azobis(4-cyano)pentaneacid were dissolved in 60 ml of freshly distilled dioxane. The mixture was degassed under a stream of argon for one hour and heated at 80° C. under argon atmosphere for 21 hours. The solvent was evaporated and the resulting dark orange oil was recrystallized from hexanes twice.
Yield: 52%
$^1$H-NMR (CDCl$_3$/300 MHz): δ[ppm]: 0.87; (t, 3H); 1.12-1.45; (m, 18H); 1.68; (q, 2H); 1.87; (s, 3H); 2.30-2.63; (m, 2H); 2.68; (t, 2H); 3.32; (t, 2H)
Synthesis of PNIPAM-CTA All NIPAM-polymers were prepared in a Schlenk tube containing N-isopropyacrylamide, CTA, AIBN and dry dioxane as a solvent. The exact amount of all components can be obtained from Table 1. After three freeze-pump thaw cycles the mixture was placed in a preheated oil bath at 80° C. for 20 hours. The mixture was precipitated in hexane (poor solvent)/THF (good solvent) three times and dried under vacuum. Table 1 further shows the amount of used NIPAM (N-isopropylacrylamide) monomer, CTA (DMP or CDSMB), AIBN and dioxane. The yield refers to the amount of monomer used. Molecular weights were measured by GPC in DMF using PMMA as calibration.

TABLE 1

| Sample | NIPAM/ mmol | DMP/ mmol | CDSMB/ mmol | AIBN/ mmol | Dioxane/ ml | Yield/ % | M(calc.)/ (g/mol) | M(GPC)/ (g/mol) | PDI |
|---|---|---|---|---|---|---|---|---|---|
| PNI 1  | 8.8  | 0.44 | 0    | 0.04 | 6 | 94 | 2263  | 1461 | 1.13 |
| PNI 2  | 8.8  | 0.29 | 0    | 0.03 | 6 | 98 | 3395  | 3008 | 1.16 |
| PNI 3  | 8.8  | 0.18 | 0    | 0.02 | 6 | 94 | 5658  | 3251 | 1.14 |
| PNI 4  | 8.8  | 0    | 0.18 | 0.02 | 6 | 96 | 5658  | 4727 | 1.17 |
| PNI 5  | 8.8  | 0    | 0.10 | 0.01 | 6 | 89 | 10184 | 6096 | 1.18 |
| PNI 6  | 8.8  | 0    | 0.18 | 0.02 | 6 | 98 | 5658  | 4723 | 1.16 |
| PNI 7  | 8.8  | 0    | 0.09 | 0.01 | 6 | 96 | 11316 | 5905 | 1.13 |
| PNI 8  | 17.7 | 0    | 0.29 | 0.03 | 8 | 96 | 6790  | 5749 | 1.19 |
| PNI 9  | 17.7 | 0    | 0.25 | 0.03 | 8 | 92 | 7921  | 5202 | 1.17 |
| PNI 10 | 17.7 | 0    | 0.20 | 0.02 | 8 | 93 | 10184 | 6785 | 1.37 |
| PNI 11 | 17.7 | 0    | 0.59 | 0.06 | 8 | 99 | 3395  | 3055 | 1.14 |

The CDSMB proved more effective as shown in Table 2. Three polymers were synthesized to have the same calculated molecular weight, one with DMP and two with 4-Cyano-4-dodecylsulfanylthiocarbonylsulfanyl-4-methyl butyric acid. The discrepancy from the calculated molecular weight of the polymer and the weight measured by GPC in DMF is smaller for the CDSMB. Also the reproducibility was very good for the reaction with 4-Cyano-4-dodecylsulfanylthiocarbonyl-sulfanyl-4-methyl butyric acid.

TABLE 2

| Sample | M (calc.)/ (g/mol) | M (GPC)/ (g/mol) | PDI | M (calc) – M (GPC)/ (g/mol) | CTA |
|---|---|---|---|---|---|
| PNI 3 | 5658 | 3251 | 1.13 | 2407 | DMP |
| PNI 4 | 5658 | 4727 | 1.17 | 931  | CDSMB |
| PNI 6 | 5658 | 4723 | 1.16 | 935  | CDSMB |

The cleavage of the trithiocarbonate end group was done by aminolysis. The aminolysis was performed by stirring a mixture of PNIPAM-CTA and amine in THF for several hours at room temperature. The transformation to the thiol-group was tested with two amines: ethanolamine and hexylamine.

Kinetic measurements by UV-vis spectroscopy confirmed the completeness of the reaction after one hour. The spectrum was measured every 15 minutes after adding the amine to the solution of the polymer.

The cleavage of the trithiocarbonate-group was confirmed by UV-vis spectroscopy for both amines by absence of the absorption band at 310 nm (C=S). For further studies hexylamine was chosen for the cleavage because of its good solubility in hexane, which was used to precipitate the polymer after the reaction. FIG. 1 compares the spectra of the pure CTA (1), and PNIPAM with trithiocarbonate-end group (2) and SH-end group (3), at which the decrease and loss the absorption band of the trithiocarbonate group is shown.

Example 2

In this example, functionalization of a styrene-butadiene rubber with RAFT-polymerized PNIPAM is illustrated.
Synthesis of Functionalized Rubber Elastomers Functionalized elastomer was produced using the following general procedure: A solution of SBR, AIBN and the thiol in dry THF was degassed under argon atmosphere at room temperature for 2 hours. The exact amount of educts for each reaction is shown in Table 3. The reaction mixture was then placed in a preheated oil bath at 70° C. for at least 20 hours. To make sure that no free thiol was in the reaction product, the product was dialyzed against THF for three days. After the dialysis the solvent was evaporated and the product was dried under vacuum. The results of the elemental analysis of three functionalized elastomers are shown in Table 4, with the calculated weight percent of PNIPAM in the resulting fucntionalized SBR.

Figure 2:
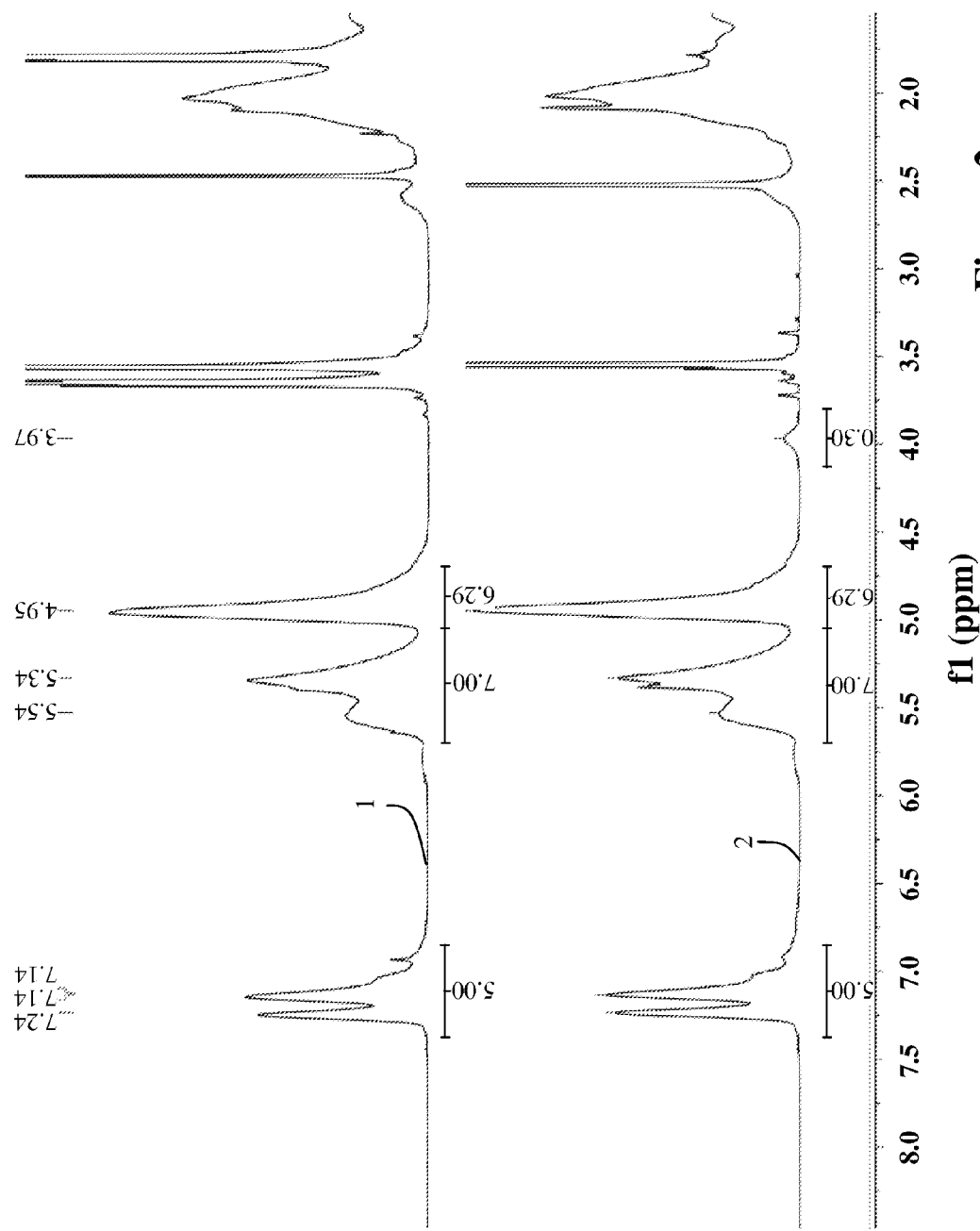
FIG. 2 shows the $^1$H-NMR spectrum of a styrene-butadiene elastomer and of a styrene-butadiene elastomer functionalized with PNIPAM.
Figure 3:
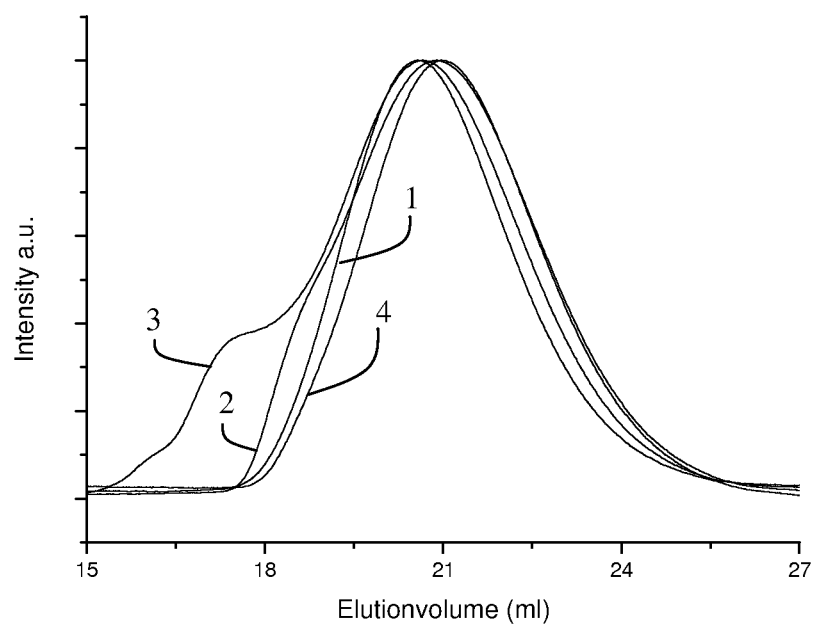
FIG. 3 shows GPC curves for a styrene-butadiene elastomer and for three PNIPAM-functionalized styrene-butadiene elastomers.

The $^1$H-NMR spectrum of the SBR (1) and of the functionalized rubber (2) are shown in FIG. 2. As seen in FIG. 2, the typical elastomer signals are observable, but also the peak of the CH-group of the isopropyl-group of PNIPAM at 3.97 ppm. Again a decrease of the vinyl signals can be observed, indicating a successful functionalization. GPC measurements indicated little cross linking if any of all samples as seen in FIG. 3. FIG. 3 shows exemplary GPC curves for the SBR (1) and for three functionalized elastomers SBR2 (2), SBR5 (3) and SBR6 (4). As indicated by the presence of the shoulder at about 16-17 ml elution volume in FIG. 3, SBR6 showed no cross linking during the reaction, SBR2 showed very little cross linking and SBR 5 shows some cross linking. All three samples were soluble, indicating they were not greatly cross linked.

TABLE 3

| Sample | weight PNIPAM/ (SBR) | PNIPAM used [1] | mass SBR/ g | mass AIBN/ g | mass thiol/ g | M (PNIPAM-SH)/ (g/mol) |
|---|---|---|---|---|---|---|
| SBR 1 | 20  | PNI6 | 1.0 | 0.027 | 0.20 | 4723 |
| SBR 2 | 20  | PNI7 | 1.0 | 0.027 | 0.20 | 5950 |
| SBR 3 | 10  | PNI8 | 1.0 | 0.022 | 0.10 | 5749 |
| SBR 4 | 15  | PNI8 | 1.0 | 0.023 | 0.15 | 5749 |
| SBR 5 | 5   | PNI8 | 1.0 | 0.020 | 0.05 | 5749 |
| SBR 6 | 25  | PNI3 | 1.0 | 0.003 | 0.25 | 3395 |
| SBR 7 | 200 | PNI2 | 0.5 | 0.001 | 1.17 | 3008 |

[1] from Example 1

TABLE 4

| Sample | SBR | SBR 3 | SBR 4 | SBR 5 |
|---|---|---|---|---|
| Measurement 1 | 3.753 mg | 6.968 mg | 3.472 mg | 1.344 mg |
| C/% | 89.72 | 86.95 | 85.05 | 88.21 |
| H/% | 10.50 | 10.20 | 10.14 | 8.87 |
| N/% | 0 | 1.03 | 1.29 | 0.42 |
| S/% | 0 | 0.08 | 0.29 | 0.32 |
| PNIPAM in SBR/ wt % | | 8.32 | 10.42 | 3.39 |
| Measurement 2 | 4.882 mg | 2.812 mg | 5.129 mg | 1.164 mg |
| C/% | 89.75 | 86.81 | 85.03 | 87.92 |
| H/% | 10.48 | 10.50 | 10.17 | 9.07 |
| N/% | 0 | 1.01 | 1.30 | 0.35 |

TABLE 4-continued

| Sample | SBR | SBR 3 | SBR 4 | SBR 5 |
|---|---|---|---|---|
| S/% | 0 | 0.12 | 0.12 | 0.30 |
| PNIPAM in SBR/wt % | | 8.16 | 10.50 | 2.83 |

What is claimed is:

1. A method of making a graft copolymer, comprising the steps of:
obtaining a first polymer comprising at least one carbon-carbon double bond, the first polymer derived from at least one monomer, the at least one monomer comprising a conjugated diene monomer selected from the group consisting of butadiene, isoprene, dimethylbutadiene, pentadiene, and chloroprene;
polymerizing a second monomer in the presence of a thiocarbonylthio RAFT chain transfer agent to form a polymer comprising a terminal thiocarbonylthio group;
cleaving the terminal thiocarbonylthio group to a thiol group to form the second polymer comprising a terminal thiol group;
reacting the second polymer with the first polymer to form a graft copolymer, the graft copolymer comprising a backbone derived from the first polymer and sidechains derived from the second polymer.

2. The method of claim 1, wherein the step of cleaving the terminal thiocarbonylthio group to a thiol group is done by aminolysis.

3. The method of claim 1, wherein the step of cleaving the terminal thiocarbonylthio group to a thiol group is done during rubber mixing in the presence of a nucleophile.

4. The method of claim 3, wherein the nucleophile is selected from the group consisting of diphenylguanidine, p-phenylenediamines, ammonia, and cyclohexylamine.

5. The method of claim 1, wherein the first polymer is selected from the group consisting of styrene-butadiene rubber, polybutadiene, and polyisoprene.

6. The method of claim 1, wherein the second monomer is selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, isoprene, 1,3-butadiene, ethylene, vinyl acetate, vinyl chloride, vinylidene chloride, lactones, lactams, cyclic anhydrides, cyclic siloxanes, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, .alpha.-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), a-methylvinyl benzoic acid (all isomers), diethylamino α-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, chloroprene, ethylene, vinyl acetate, vinyl chloride, vinylidene chloride, 2-(2-oxo-1-imidazolidinyl)ethyl 2-methyl-2-propenoate, 1-[2-[2-hydroxy-3-(2-propyl)propyl]amino]ethyl]-2-imidazolidinone, N-vinyl pyrrolidone, N-vinyl imidazole, crotonic acid, vinyl sulfonic acid, and combinations thereof.

7. The method of claim 1, wherein the thiocarbonylthio RAFT chain transfer agent is selected from the group consisting of dithioesters, trithiocarbonates, dithiocarbamates, and xanthates.

8. The method of claim 1, wherein the first and second polymers are reacted during rubber mixing.

* * * * *